United States Patent
Isogai et al.

(10) Patent No.: US 7,744,061 B2
(45) Date of Patent: Jun. 29, 2010

(54) BUTTERFLY VALVE WITH FLOW STRAIGHTENING

(75) Inventors: Tomiharu Isogai, Obu (JP); Hisashi Kino, Obu (JP); Shin Iwaoka, Kariya (JP); Hiroyuki Kado, Obu (JP)

(73) Assignees: Aisan Kogyo Kabushiki Kaisha, Obu-Shi (JP); Denso Corporation, Kariya-Shi (JP)

( * ) Notice: Subject to any disclaimer, the term of this patent is extended or adjusted under 35 U.S.C. 154(b) by 855 days.

(21) Appl. No.: 11/542,205

(22) Filed: Oct. 4, 2006

(65) Prior Publication Data

US 2007/0102661 A1 May 10, 2007

(30) Foreign Application Priority Data

Nov. 4, 2005 (JP) .............................. 2005-320310

(51) Int. Cl.
*F16K 1/22* (2006.01)
(52) U.S. Cl. ....................................... 251/208; 251/305
(58) Field of Classification Search ................. 251/305, 251/306, 307, 308, 208; 123/337
See application file for complete search history.

(56) References Cited

U.S. PATENT DOCUMENTS

| | | | | |
|---|---|---|---|---|
| 2,986,373 A | * | 5/1961 | Masheder | 251/305 |
| 3,096,071 A | * | 7/1963 | Fisher | 251/306 |
| 3,684,239 A | * | 8/1972 | Schwartzbart et al. | 251/307 |
| 4,243,203 A | * | 1/1981 | Mack | 251/305 |
| 5,160,118 A | * | 11/1992 | Stary | 251/305 |
| 6,354,267 B1 | * | 3/2002 | Kotchi et al. | 123/337 |
| 6,354,567 B1 | * | 3/2002 | Vanderveen et al. | 251/308 |
| 6,412,752 B1 | * | 7/2002 | Daly et al. | 251/129.11 |
| 6,824,119 B2 | * | 11/2004 | Conley et al. | 251/305 |
| 6,901,942 B2 | * | 6/2005 | Krimmer et al. | 251/305 |
| 6,923,157 B2 | * | 8/2005 | Torii et al. | 123/337 |
| 2004/0051071 A1 | * | 3/2004 | Ando et al. | 251/208 |
| 2005/0109971 A1 | * | 5/2005 | Sano et al. | 251/305 |

FOREIGN PATENT DOCUMENTS

| JP | U 1-60080 | 4/1989 |
|---|---|---|
| JP | A 11-173432 | 6/1999 |

* cited by examiner

*Primary Examiner*—John Bastianelli
(74) *Attorney, Agent, or Firm*—Oliff & Berridge, PLC (57) ABSTRACT

A butterfly valve comprises a valve shaft placed across a flow passage and a plate-like valve element provided on the valve shaft so as to be rotatable about the valve shaft to regulate a flow rate of fluid in the flow passage. The valve element has a section that gradually decreases in thickness from the valve shaft toward an outer edge in a direction nearly perpendicular to the valve shaft. The valve element further includes a plurality of inclined surfaces on each side so that the corresponding inclined surfaces on both sides of the valve element are identical in section in a direction parallel to the valve shaft. The valve element is provided on each side with a plurality of flow straightening ribs each extending in a direction perpendicular to the valve shaft and inclining along each inclined surface.

20 Claims, 14 Drawing Sheets

Turbulence of air

Flow of air

BUTTERFLY VALVE WITH FLOW STRAIGHTENING

BACKGROUND OF THE INVENTION

1. Field of the Invention

The present invention relates to a butterfly valve comprising a valve shaft to be placed across a flow passage and a plate-like valve element arranged on the valve shaft, the valve element being rotatable about the valve shaft to regulate a flow rate of fluid in the flow passage.

2. Description of Related Art

Recent internal combustion engines has faced a challenge to an expansion in the range of a flow rate of air allowed to pass through an intake passage of a throttle valve in order to meet demands for increasing gas mileage and achieving high power. If a bore diameter of a part in which the throttle valve is mounted is increased, the flow rate of air allowed to pass through the bore while the throttle valve is in a full open position generally increases, enhancing output power of the international combustion engine. However, this structure would also cause an increase in an idle flow rate of air allowed to flow during an idle operation with the throttle valve held in a nearly closed position, thus deteriorating gas mileage of the internal combustion engine. For this reason, the flow rate at full open has to be increased without increasing the bore diameter in order to achieve high output power of the internal combustion engine.

Figure 30:
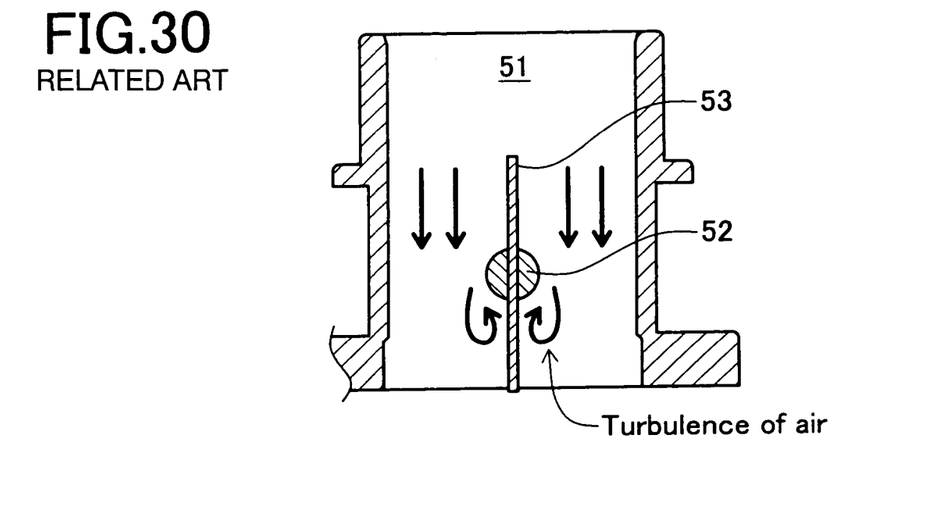
FIG. 30 is a partially-sectional plan view of a throttle body including a butterfly valve in a conventional art.

As the throttle valve, conventionally, a so-called butterfly valve has been used. This type of butterfly valve is disclosed in for example Japanese unexamined utility model application publication No. 1(1989)-60080 and Japanese unexamined patent application publication No. 11(1999)-173432. The butterfly valve disclosed in the publication '080 is a conventional product, as shown in FIG. 30, which includes a valve shaft 52 placed across a flow passage 51 and a nearly disc-shaped valve element 53 arranged on the valve shaft 52 so as to be rotatable about the valve shaft 52 to regulate the flow rate of fluid allowed to pass through the flow passage 51. Herein, the valve element 53 is designed to have a uniform thickness smaller than the outer diameter of the valve shaft 52.

Figure 31:
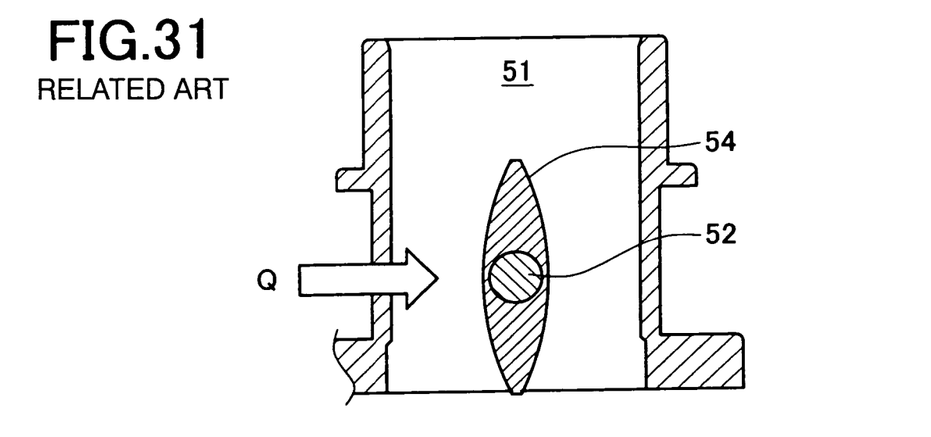
FIG. 31 is a partially-sectional plan view of a throttle body including a butterfly valve in another conventional art.
Figure 32:
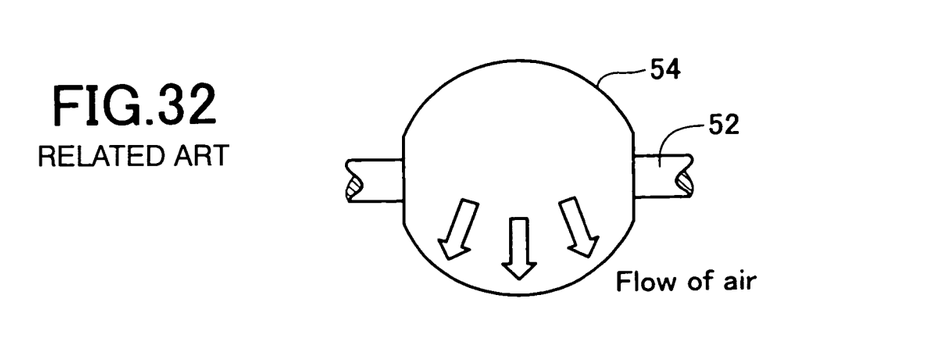
FIG. 32 is a view of the butterfly valve seen from an arrow Q in FIG. 31.

Further, the butterfly valve disclosed in the publication '432 includes, as shown in FIGS. 31 and 32, a valve shaft 52 placed across a flow passage 51 and a plate-like valve element 54 arranged on the valve shaft 52 so as to be rotatable about the valve shaft 52 to regulate the flow rate of fluid allowed to pass through the flow passage 51. Here, the valve element 54 has a curved surface of a curvature radius which is constant from the valve shaft 52 to an outer edge. Specifically, the valve element 54 has a section area decreasing radially outwardly from the center. Both sides of the valve element 54 is streamlined with no irregularity in three dimensions.

Since the conventional butterfly valves are made of metal in many cases, however, design freedom for shape would be low and accordingly there have been less ideas or designs to reduce air resistance. On the other hand, recently a butterfly valve made of resin has been adopted to define the direction of air flow by utilizing design freedom for shape. However, no idea has been proposed to increase the area of a flow passage.

In the butterfly valve disclosed in the publication '080, the flow line is sharply changed around the valve shaft 52 when the valve element 53 is in the full open position. This would cause turbulence of flow in a region downstream from the valve shaft 52. Accordingly, the flow rate at full open would be decreased by the flow quantity of fluid involved in the flow turbulence.

The butterfly valve disclosed in the publication '432, on the other hand, tends to cause less flow turbulence around the valve shaft 52 than the butterfly valve of the publication '080, i.e. the conventional product, particularly at full open of the valve element 54, but tends to cause a surface flow of fluid flowing radially outwardly from the center of the valve element 54. This surface flow is not parallel to the flow passage 51, which may cause flow turbulence of fluid, resulting in large pressure loss of the fluid and hence nonsmooth flow of the fluid. For this reason, the flow rate of fluid passing through the flow passage 51 at full open of the valve element 54, that is, the full open flow rate may be decreased.

BRIEF SUMMARY OF THE INVENTION

The present invention has been made in view of the above circumstances and has an object to provide a butterfly valve capable of increasing the flow rate of fluid allowed to pass through a flow passage when a valve element is in a full open position.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, according to one aspect, there is provided a butterfly valve mountable in a valve body formed with a flow passage, the butterfly valve comprising: a valve shaft placed across the flow passage; and a plate-like valve element provided on the valve shaft so as to be rotatable about the valve shaft to regulate a flow rate of fluid in the flow passage; wherein the valve element includes at least a flow straightening surface providing a section that gradually decreases in thickness from the valve shaft toward an outer edge in a direction nearly perpendicular to the valve shaft and that is uniform at any position along the valve shaft.

According to another aspect, the present invention provides a butterfly valve mountable in a throttle valve including a flow passage, the butterfly valve comprising: a valve shaft placed across the flow passage; and a plate-like valve element provided on the valve shaft so as to be rotatable about the valve shaft to regulate a flow rate of fluid in the flow passage; wherein the valve element includes, on each side thereof, a groove extending in the direction nearly perpendicular to the valve shaft while traversing the center of each side.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

First Embodiment

A detailed description of a first preferred embodiment of a butterfly valve of the present invention will now be given referring to the accompanying drawings.

Figure 1:
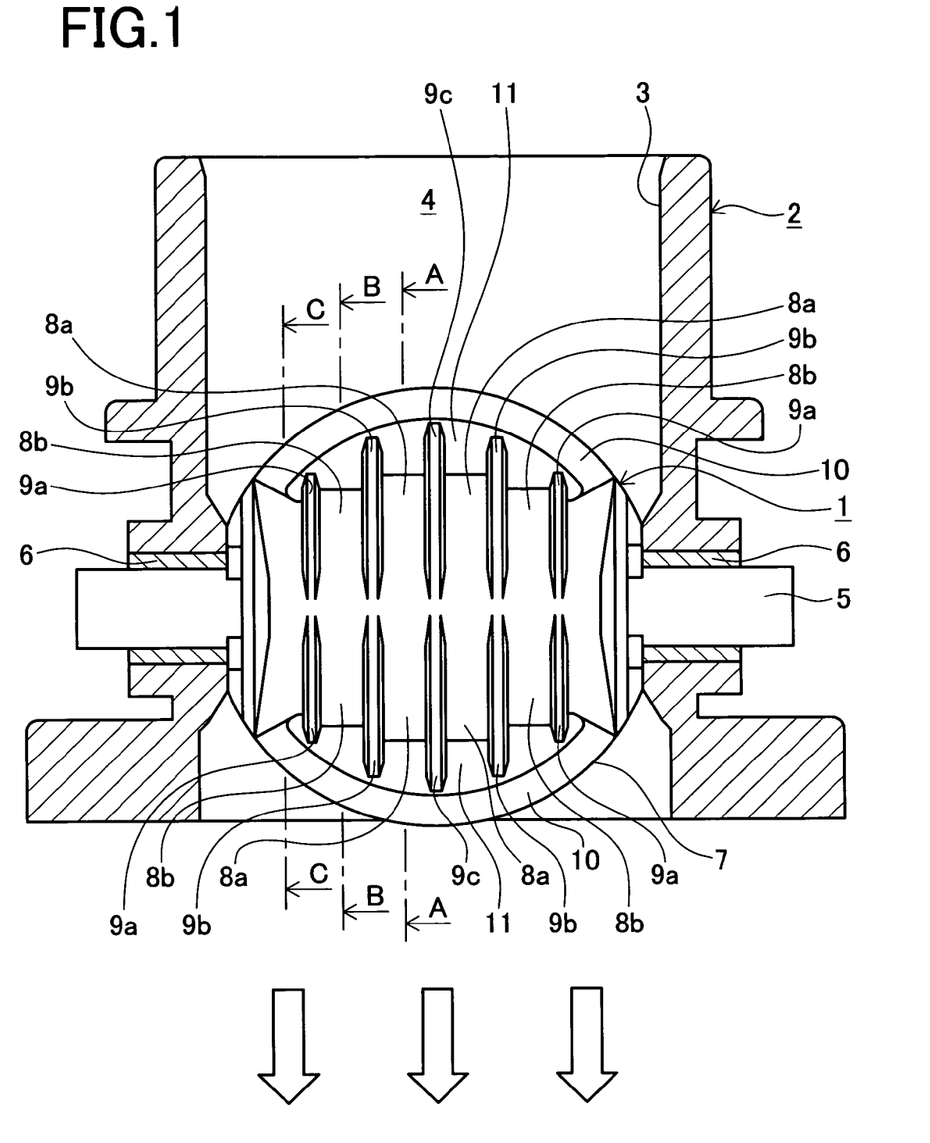
FIG. 1 is a partially-sectional plan view of a throttle body including a butterfly valve in a first embodiment.
Figure 2:
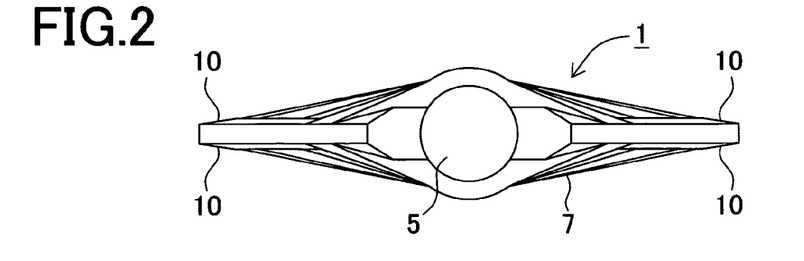
FIG. 2 is a right side view of the butterfly valve of FIG. 1.
Figure 3:
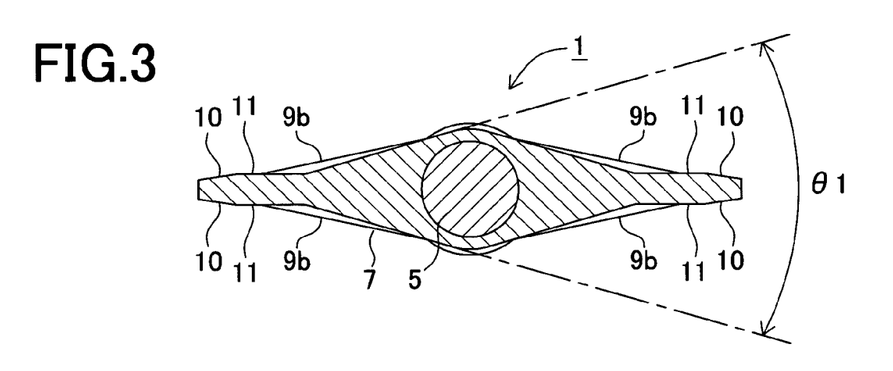
FIG. 3 is a sectional view of the butterfly valve taken along a line A-A of FIG. 1.
Figure 4:
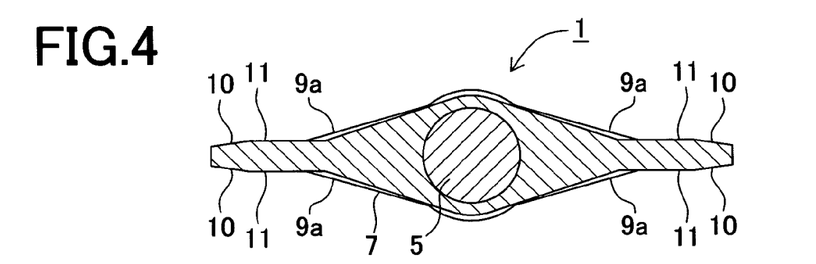
FIG. 4 is a sectional view of the butterfly valve taken along a line B-B of FIG. 1.
Figure 5:
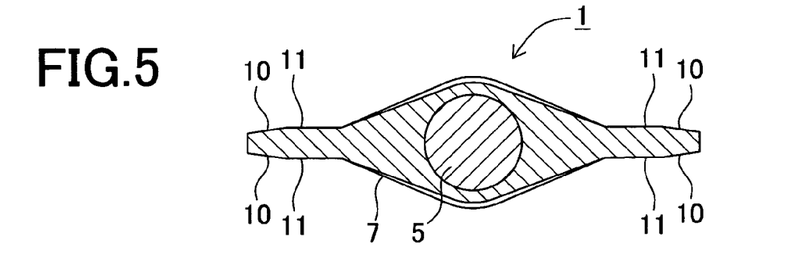
FIG. 5 is a sectional view of the butterfly valve taken along a line C-C of FIG. 1.

FIG. 1 is a partially-sectional plan view of a throttle body 2 serving as a valve body including a butterfly valve 1 in the present embodiment. FIG. 2 is a right side view of the butterfly valve 1. FIG. 3 is a sectional view of the butterfly valve 1 taken along a line A-A of FIG. 1; FIG. 4 is a sectional vie of same taken along a line B-B of FIG. 1; and FIG. 5 is a sectional view of same taken along a line C-C of FIG. 1.

The throttle body 2 includes a bore 3 connectable to an intake passage (an intake pipe) of an internal combustion engine. This bore 3 forms a flow passage 4 which allows a fluid, or air, to pass through. The throttle body 2 is provided with a valve shaft 5 extending across this flow passage 4. Both ends of the valve shaft 5 are rotatably supported in the throttle body 2 by means of bearings 6. A plate-like valve element 7 is arranged on the valve shaft 5 and, specifically, provided to integrally hold therein the valve shaft 5 as shown in FIG. 2. The valve element 7 is of a nearly rhomboidal shape in section or side view. The butterfly valve 1 is configured to rotate the valve element 7 about the valve shaft 5, thereby regulating a flow rate of air allowed to pass through the flow passage 4 (the bore 3). FIG. 1 shows the butterfly valve 1 in a full open position to fully open the flow passage 4. In the present embodiment, the valve shaft 5 is made of metal and the valve element 7 is made of resin. For instance, when the valve element 7 is to be injection-molded, the valve shaft 5 is insert-molded with the valve element 7, thereby producing the valve shaft 5 and valve element 7 in an integral form.

As shown in FIGS. 1 to 5, the valve element 7 is tapered in section in a direction perpendicular to the valve shaft 5, that is, gradually decreases in thickness from the valve shaft 5 to an outer edge. In other words, the valve element 7 is of a tapered section so that both sides are symmetrically inclined from the valve shaft 5 to the outer edge. Further, the valve element 7 includes, on each side (i.e. face) thereof, a plurality of inclined surfaces 8a and 8b arranged along the valve shaft 5 but each extending at a slant in a direction perpendicular to the valve shaft 5. In the present embodiment, the valve element 7 is further provided on each side with a plurality of flow straightening ribs 9a to 9c each of which extends in the direction perpendicular to the valve shaft 5 and inclines downward from the valve shaft 5 to the outer edge as with the inclined surfaces 8a and 8b. The plurality of flow straightening ribs 9a to 9c is arranged in parallel at even intervals. Of those flow straightening ribs 9a to 9c, two first ribs 9a located at outermost positions close to both ends of the valve shaft 5 are the shortest, two second ribs 9b located inward from the first ribs 9a are slightly longer, and a single, third rib 9c centrally located is the longest. In other words, each side of the valve element 7 is of a symmetrical shape with respect to the central third flow straightening rib 9c so that the first inclined surfaces 8a each formed between the third rib 9c and the second rib 9b and the second inclined surfaces 8b each formed between the second rib 9b and the first rib 9a provide different tapered sections from each other. In the first inclined surface 8a, the section of the valve element 7 in the direction perpendicular to the valve shaft 5 is uniform at any position along the valve shaft 5. Similarly, within the second inclined surface 8b, the section taken in the direction perpendicular to the valve shaft 5 is uniform at any position along the valve shaft 5, but different from the section defined by the first inclined surface 8a. In a word, the first inclined surface 8a and the second inclined surface 8b have different taper angles (inclination angles) from each other in section. FIG. 3 shows the taper angle θ1. In the present embodiment, the taper angle θ1 is set to a value in a range of 10° to 35°. As shown in FIG. 1, the outer edge part of the valve element 7 is formed as a peripheral edge part 10 having a constant width and gently inclining down toward the periphery of the valve element 7. Between this peripheral edge part 10 and each end of the inclined surfaces 8a and 8b, a flat surface 11 with no inclination is formed. In FIG. 1, the valve element 7 is vertically symmetrical in shape with respect to the valve shaft 5. Assuming that the front side of the valve element 7 in FIG. 1 is an upstream face of the valve element 7, the back side is a downstream face of the valve element 7, which is formed in the same shape as the upstream face.

Figure 6:
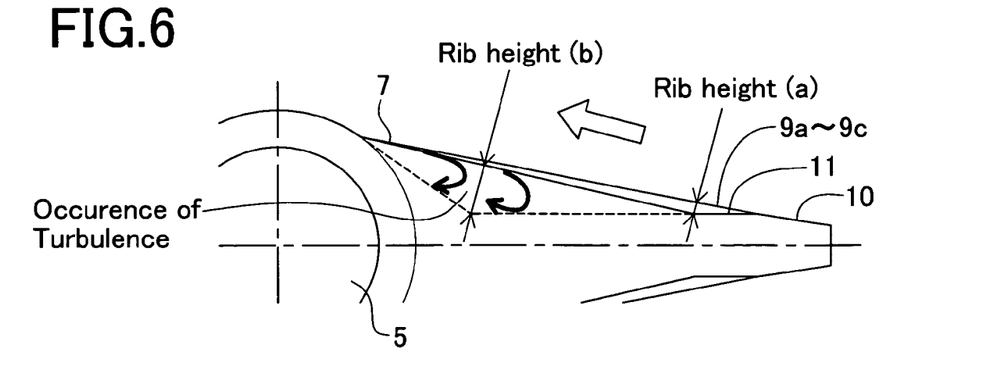
FIG. 6 is an explanatory view showing heights of a rib.
Figure 7:
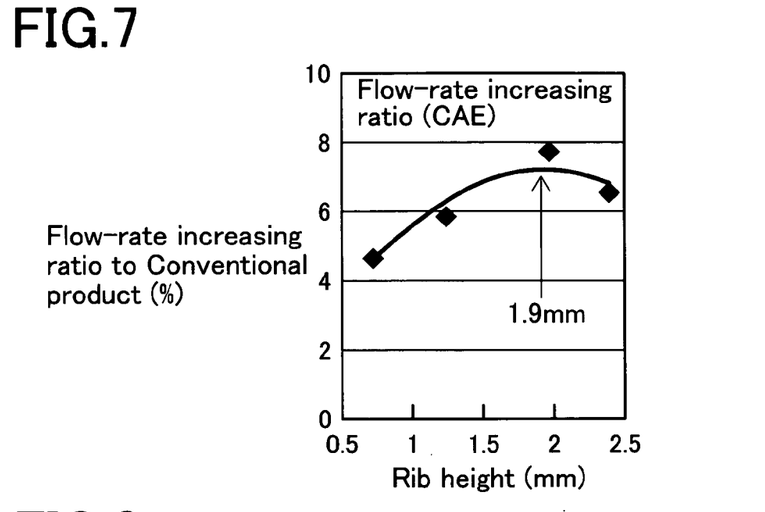
FIG. 7 is a graph showing a difference in a flow-rate increasing ratio with respect to a conventional product in relation to the heights of the rib.

Referring to FIG. 6, the heights of the flow straightening ribs 9a to 9c ("rib height") will be explained below. In the present embodiment, the rib height is defined as indicated by (a) in FIG. 6. If the valve element 7 is designed to have an excessively large rib height as indicated by (b) in FIG. 6, the separation, or turbulence, of the flow of air will be caused. To avoid this, the rib height is set to a value in the range not excessive, as (a) in FIG. 6. FIG. 7 is a graph showing an "increasing ratio (%) of a flow rate (hereinafter, "flow-rate increasing ratio") compared to a conventional product" with respect to the range of not excessive rib height (0.5 mm to 2.5 mm). This "flow-rate increasing ratio" represents an increasing ratio of a flow rate with respect to a conventional product, i.e. the full open flow rate allowed by the conventional butterfly valve shown in FIG. 30. As apparently from this graph, for a rib height of 1.9 mm, the flow-rate increasing ratio (CAE) is as highest as about 7%. Based on this result, in the present embodiment, the height of each rib 9a to 9c is set to 1.9 mm.

According to the butterfly valve 1 in the present embodiment explained above, the valve element 7 has a tapered section and includes the plurality of inclined surfaces 8a and 8b which are individually uniform in section at any position along the valve shaft 5. This makes the flow of air along the both sides of the valve element 7 parallel to the flow passage 4 when the valve element 7 is in a full open position in the flow passage as shown in FIG. 1, thus preventing the air from becoming turbulent due to the valve element 7. Accordingly, pressure loss caused by the valve element 7 in the full open position can be reduced. Similarly, the flow rate of air allowed to pass through the flow passage 4 when the valve element 7 is in the full open position, that is, the full open flow rate can be increased as compared with the conventional product.

In the present embodiment, furthermore, the flow of air along each side of the valve element 7 is made parallel to the flow passage 4 by flow straightening action of the ribs 9a to 9c, which restrains the turbulence of air. Thus, the pressure loss caused by the valve element 7 in the full open position can further be reduced by just a quantity obtained by the flow straightening action of the ribs 9a to 9c. This makes it possible to further increase the full open flow rate.

Figure 8:
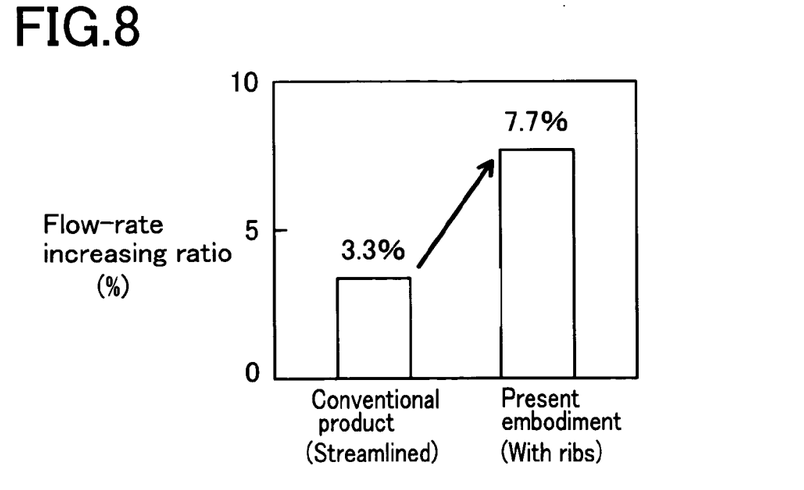
FIG. 8 is a graph showing the flow-rate increasing ratio in comparison.

Here, it has been determined that the flow-rate increasing ratio by the conventional streamlined butterfly valve shown in FIGS. 31 and 32 is "about 3.3%" with respect to the full open flow rate by the conventional product (the butterfly valve of FIG. 30). On the other hand, it has been determined that the flow-rate increasing ratio by the butterfly valve 1 in the present embodiment is "about 7.7%" with respect to the full open flow rate by the conventional product. According to the butterfly valve 1 in the present embodiment, accordingly, it is found as seen in FIG. 8 that the flow-rate increasing ratio can be increased even compared with the streamlined butterfly valve.

Second Embodiment

A second embodiment of the butterfly valve of the present invention will be explained below referring to the accompanied drawings.

Figure 9:
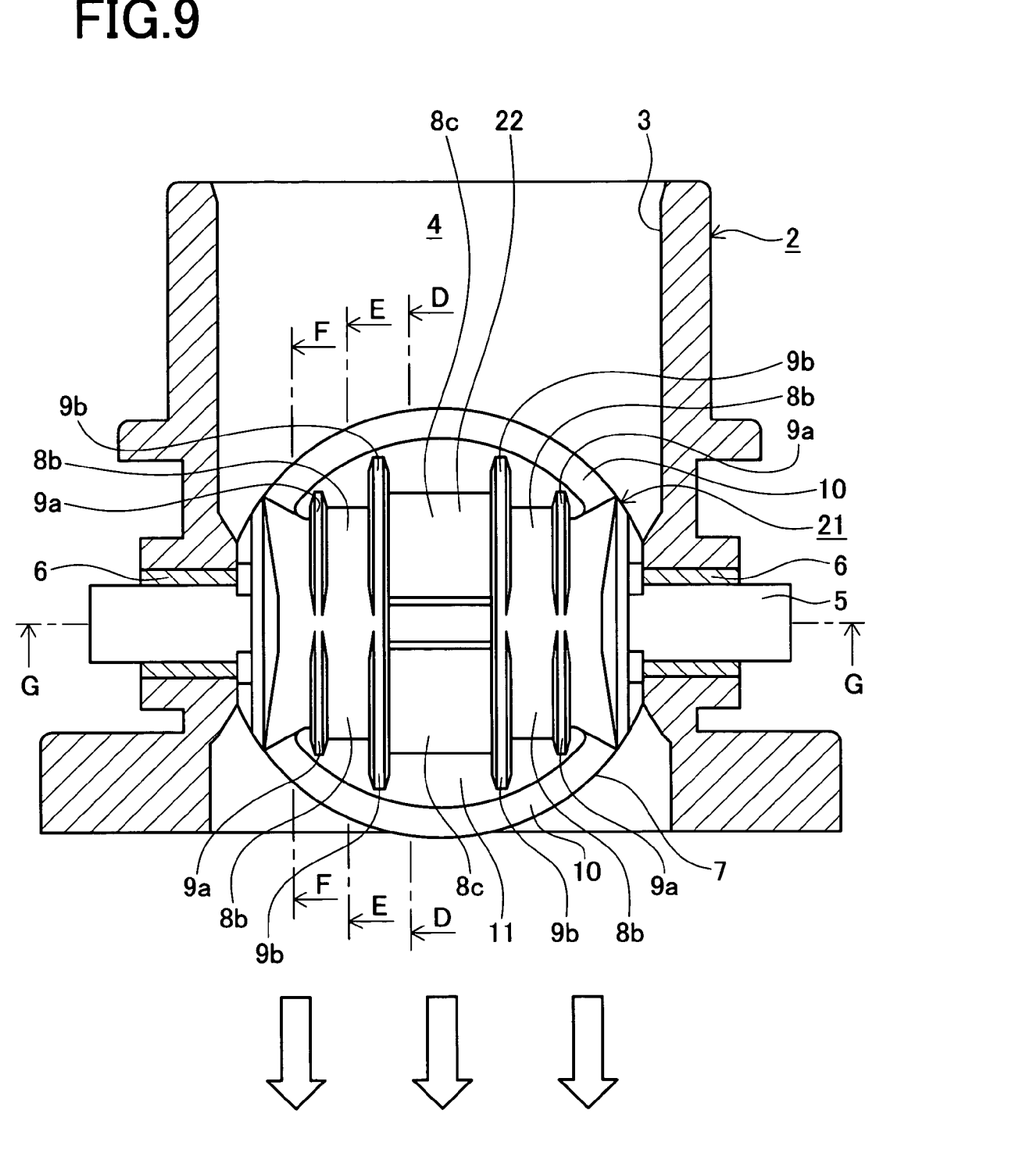
FIG. 9 is a partially-sectional plan view of a throttle body including a butterfly valve in a second embodiment.
Figure 10:
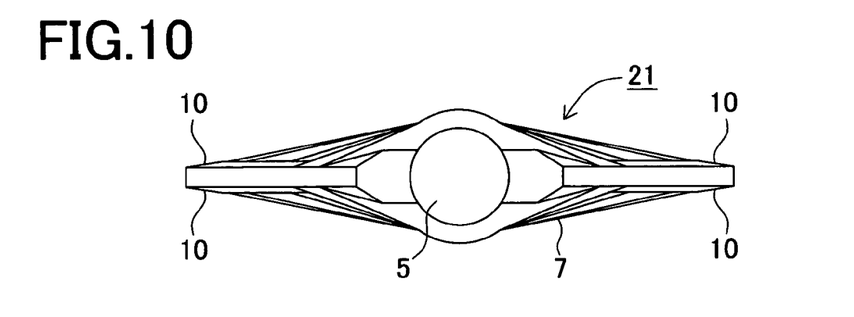
FIG. 10 is a right side view of the butterfly valve of FIG. 9.
Figure 11:
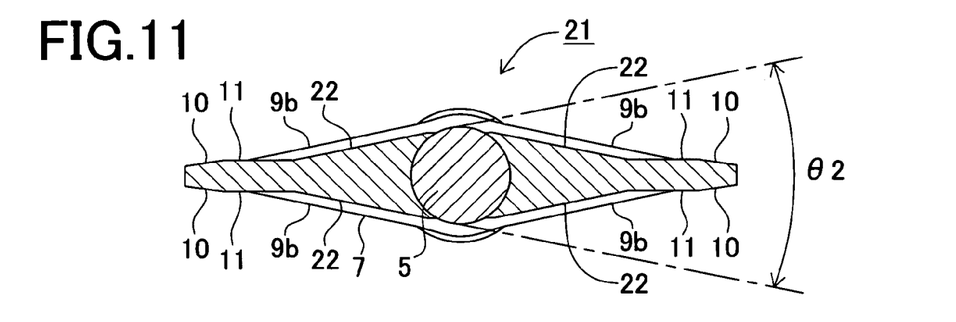
FIG. 11 is a sectional view of the butterfly valve taken along a line D-D of FIG. 9.
Figure 12:
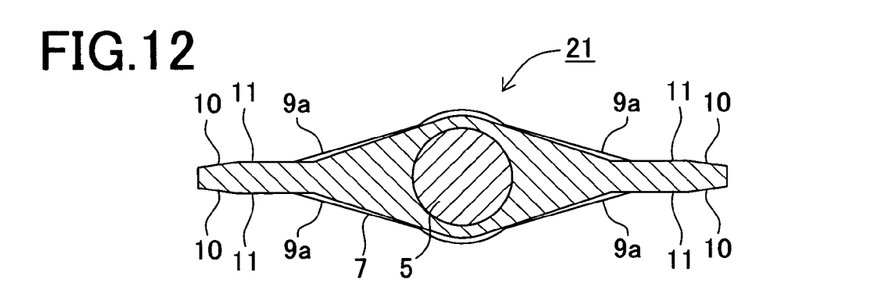
FIG. 12 is a sectional view of the butterfly valve taken along a line E-E of FIG. 9.
Figure 13:
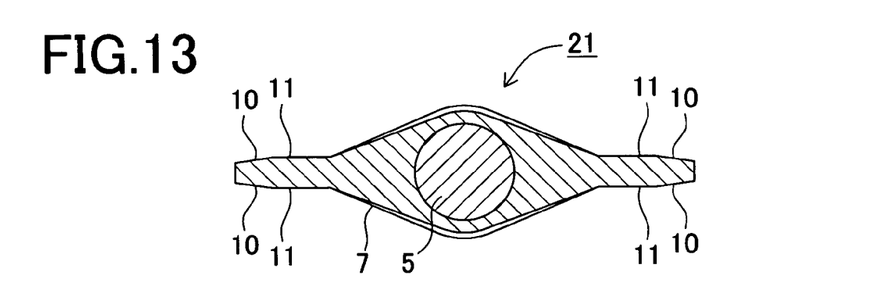
FIG. 13 is a sectional view of the butterfly valve taken along a line F-F of FIG. 9.
Figure 14:
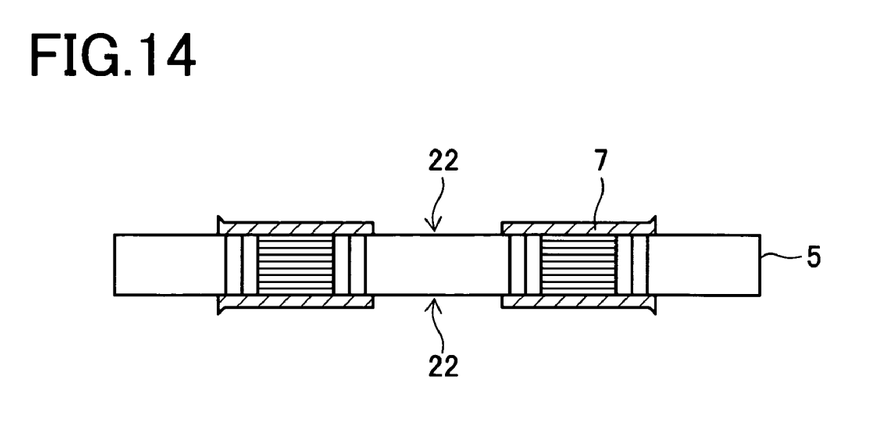
FIG. 14 is a sectional view of the butterfly valve taken along a line G-G of FIG. 9.

FIG. 9 is a partially-sectional plan view of a throttle body 2 including the butterfly valve 21 in the present embodiment. FIG. 10 is a right side view of the butterfly valve 21 of FIG. 9. FIG. 11 is a sectional view of the butterfly valve 21 taken along a line D-D of FIG. 9. FIG. 12 is a sectional view of the butterfly valve 21 taken along a line E-E of FIG. 9. FIG. 13 is a sectional view of the butterfly valve 21 taken along a line F-F of FIG. 9. FIG. 14 is a sectional view of the butterfly 21 valve taken along a line G-G of FIG. 9.

The butterfly valve 21 in the present embodiment differs in the following respects from the butterfly valve 1 in the first embodiment. Specifically, this butterfly valve 21 is provided with a groove 22 extending in a direction perpendicular to the valve shaft 5 while traversing the center of each side of the valve element 7. As shown in FIG. 9, this groove 22 is formed between two second flow straightening ribs 9b. As shown in FIG. 11, the taper angle θ2 of an inclined surface 8c formed between the two ribs 9b is smaller than the taper angle θ1 of the butterfly valve 1 in the first embodiment. In the center of this groove 22, the outer surface of the valve shaft 5 is partially exposed. However, the thickness of the valve element 7 corresponding to the groove 22 is almost equal to the outer diameter of the valve shaft 5 as shown in FIGS. 11 and 14. The butterfly valve 21 in the present embodiment is otherwise identical to the butterfly valve 1 in the first embodiment.

In the butterfly valve 21 in the present embodiment, the groove 22 is diametrically provided on each side of the valve element 7. Here, it has generally been found that a flow of air is fastest in the center area of the bore 3 in cross section. Accordingly, when the butterfly valve 21 is in the full open position, each groove 22 on each side of the valve element 7 is arranged in parallel to the fastest flow of air in the bore 3, thus increasing a passage area by the groove 22. It is therefore possible to further increase the full open flow rate at full open of the valve element 7 by just a quantity corresponding to an increased area of the flow passage by the groove 22 as compared with the butterfly valve 1 in the first embodiment.

Figure 15:
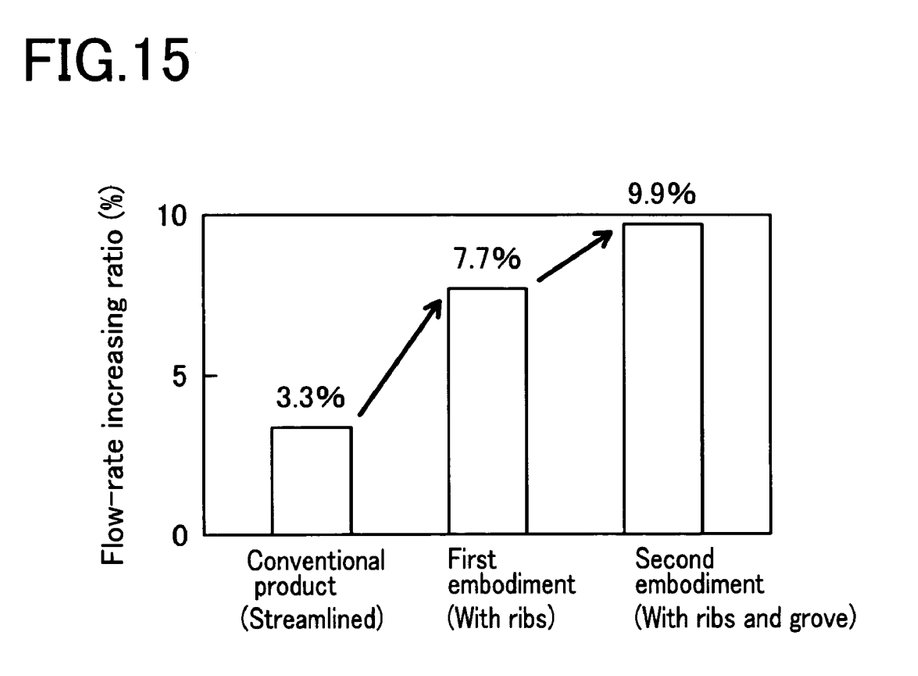
FIG. 15 is a graph showing the flow-rate increasing ratio in comparison.

It has been here determined that a flow-rate increasing ratio of "about 9.9%" could be obtained by the butterfly valve 21 in the present embodiment with respect to the full open flow rate by the above mentioned conventional product. It is accordingly found as seen in FIG. 15 that the butterfly valve 21 in the present embodiment can increase the flow-rate increasing ratio even as compared with the butterfly valve 1 in the first embodiment.

In the present embodiment, furthermore, the valve element 7 is provided with the groove 22 to reduce the thickness of the valve element 7, thereby increasing the passage area. There is a limit to a reduction in thickness of the valve element 7 because of strength of the valve element 7. It is therefore necessary to reduce the thickness of the valve element 7 at more effective portions thereof. Since the groove 22 in the present embodiment is formed extending in a direction perpendicular to the valve shaft 5 while traversing the center of each side of the valve element 7, the full open flow rate can be increased by the reduction in thickness of the valve element 7 with sufficient strength thereof maintained.

Third Embodiment

A third embodiment of the butterfly valve of the present invention will be explained below referring to the accompanied drawings.

Figure 16:
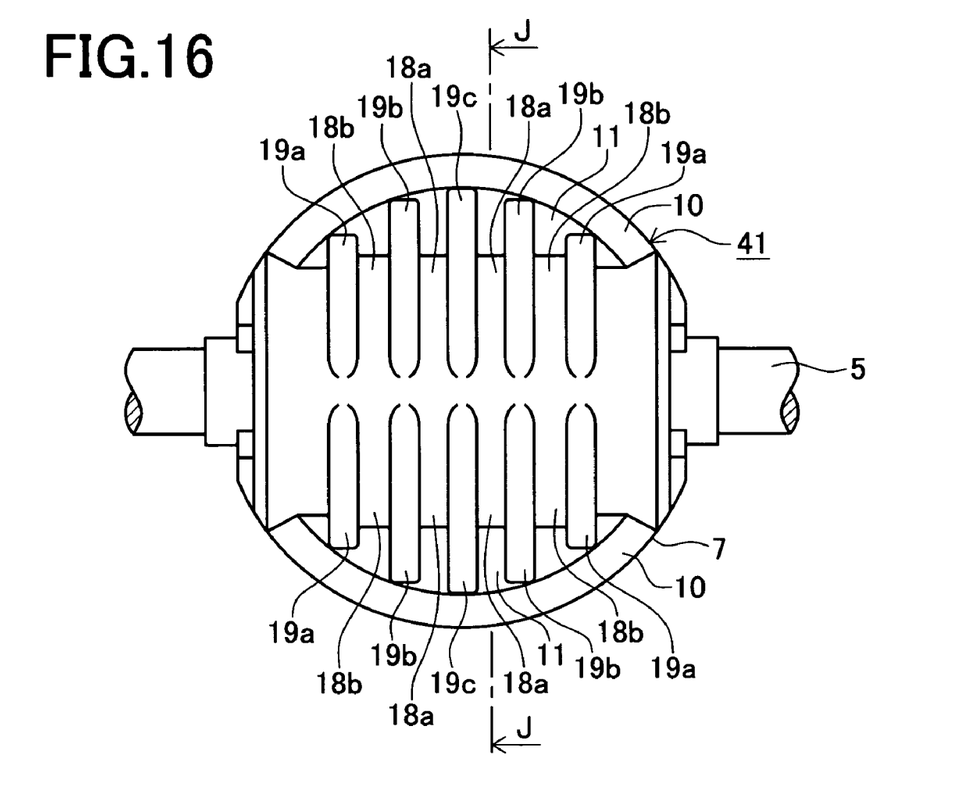
FIG. 16 is a partially-sectional plan view of a butterfly valve in a third embodiment.
Figure 17:
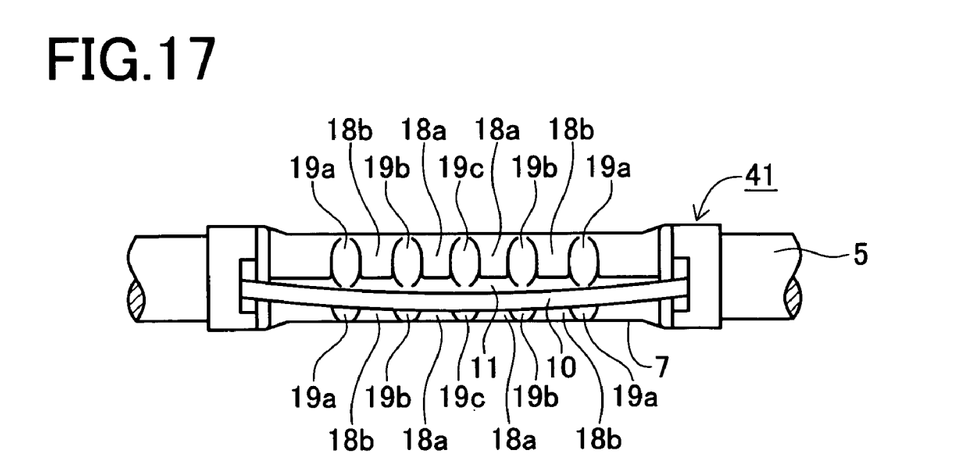
FIG. 17 is a front view of the butterfly valve of FIG. 16.
Figure 18:
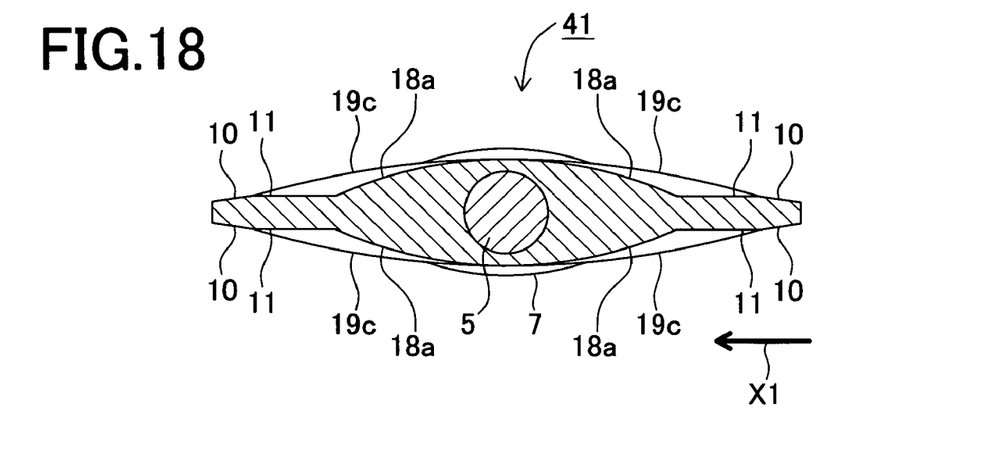
FIG. 18 is a sectional view taken along a line J-J of FIG. 16.
Figure 19:
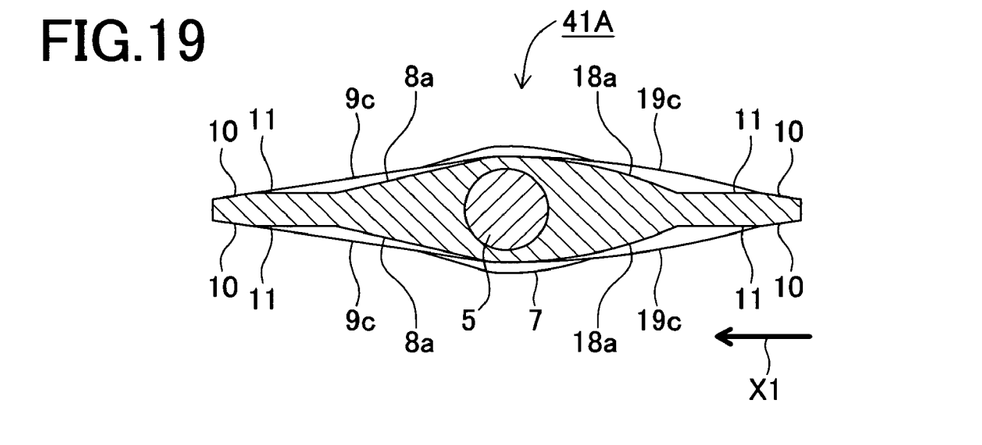
FIG. 19 is a sectional view similar to FIG. 18.
Figure 20:
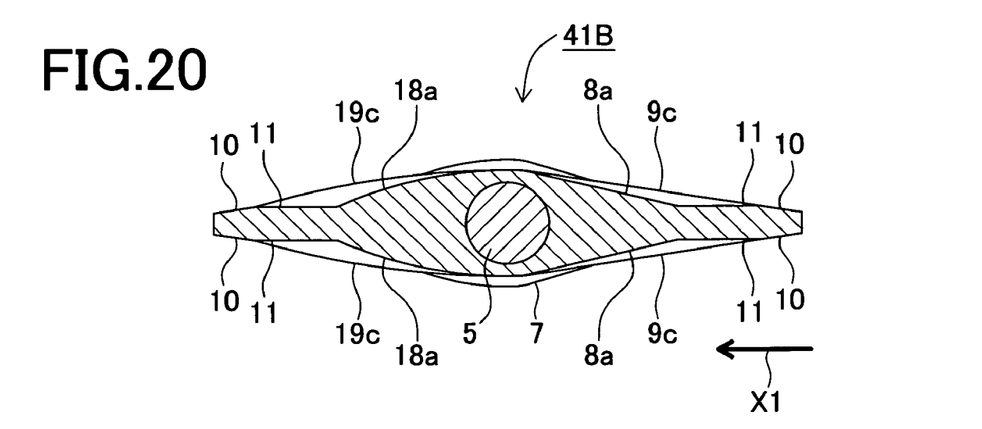
FIG. 20 is a sectional view similar to FIG. 18.

FIG. 16 is a partially-sectional plan view of a throttle body 41 in the present embodiment. FIG. 17 is a front view of the throttle body of FIG. 16. FIG. 18 is a sectional view taken along a line J-J of FIG. 16. FIGS. 19 and 20 are sectional views similar to FIG. 18, showing butterfly valves 41A and 41B as modified examples of the butterfly valve 41.

The butterfly valve 41 in the present embodiment differs in the following respects from the butterfly valve 1 in the first embodiment. Specifically, a valve element 7 of this butterfly valve 41 has a curved section in a direction perpendicular to a valve shaft 5, the section being gradually decreased in thickness from a valve shaft 5 toward an outer edge. In other words, the valve element 7 is designed to have both sides symmetrically curved in section from the valve shaft 5 toward the outer edge. The valve element 7 includes, on each side, a plurality of curved surfaces 18a and 18b arranged along the valve shaft 5 but each extending in a curve in a direction perpendicular to the valve shaft 5. In the present embodiment, as with the butterfly valve 1 in the first embodiment, the valve element 7 is provided on each side with a plurality of flow straightening ribs 19a to 19c each extending in a curve in the direction perpendicular to the valve shaft 5 as with each curved surface 18a and 18b. These ribs 19a to 19c are arranged in parallel at even intervals. In other words, each side of the valve element 7 is of a symmetrical shape with respect to the central third flow straightening rib 19c so that the first curved surfaces 18a each formed between the third rib 19c and the second rib 19b and the second curved surfaces 18b each formed between the second rib 19b and the first rib 19a provide different curved sections from each other. Within the first curved surface 18a, the section taken in the direction perpendicular to the valve shaft 5 is uniform at any position along the valve shaft 5. Similarly, within the second curved surface 18b, the section taken in the direction perpendicular to the valve shaft 5 is uniform at any position along the valve shaft 5, but different from the section defined by the first curved surface 18a. In FIG. 16, the valve element 7 is vertically symmetrical in shape with respect to the valve shaft 5. Assuming that the front side of the valve element 7 in FIG. 16 is an upstream face of the valve element 7, the back side is a downstream face of the valve element 7, which is formed in the same shape as the upstream face. As shown in FIG. 18, accordingly, the valve element 7 has the same section on an upstream side and a downstream side of the valve shaft 5 in a direction of the intake flow of air indicated by an arrow X1. Specifically, on each side of the valve element 7, the curved flow straightening rib 19c and the curved surface 18a are provided on the upstream side as well as the downstream side of the valve shaft 5.

As above, the butterfly valve 41 in the present embodiment is basically simply different in shape of section from the butterfly valve 1 in the first embodiment. Thus, the butterfly valve 41 can provide workings and effects equivalent to those by the butterfly valve 1 in the first embodiment.

The butterfly valve 41 shown in FIG. 18 is designed as above so that the valve element 7 is symmetric in section on the upstream and downstream sides of the valve shaft 5 in the direction of the intake flow of air indicated by the arrow X1. Alternatively, it is possible to configure the butterfly valve as butterfly valves 41A and 41B in FIGS. 19 and 20 in which the valve element 7 is asymmetric on the upstream and downstream sides of the valve shaft 5. As shown in FIG. 19, to be concrete, the valve element 7 may be designed such that the curved flow straightening rib 19c and the curved surface 18a are provided on each side on the upstream side, while the inclined flow straightening rib 9c and the inclined surface 8a are provided on the downstream side. As shown in FIG. 20, to the contrary, the valve element 7 may be designed such that the inclined straightening rib 9c and the inclined surface 8a are provided on each side on the upstream side, while the curved flow straightening rib 19c and the curved surface 18a are provided on the downstream side. Such modified butterfly valves 41A and 41B can also provide workings and effects equivalent to those by the butterfly valve 41.

Fourth Embodiment

A fourth embodiment of the butterfly valve of the present invention will be explained below referring to the accompanied drawings.

Figure 21:
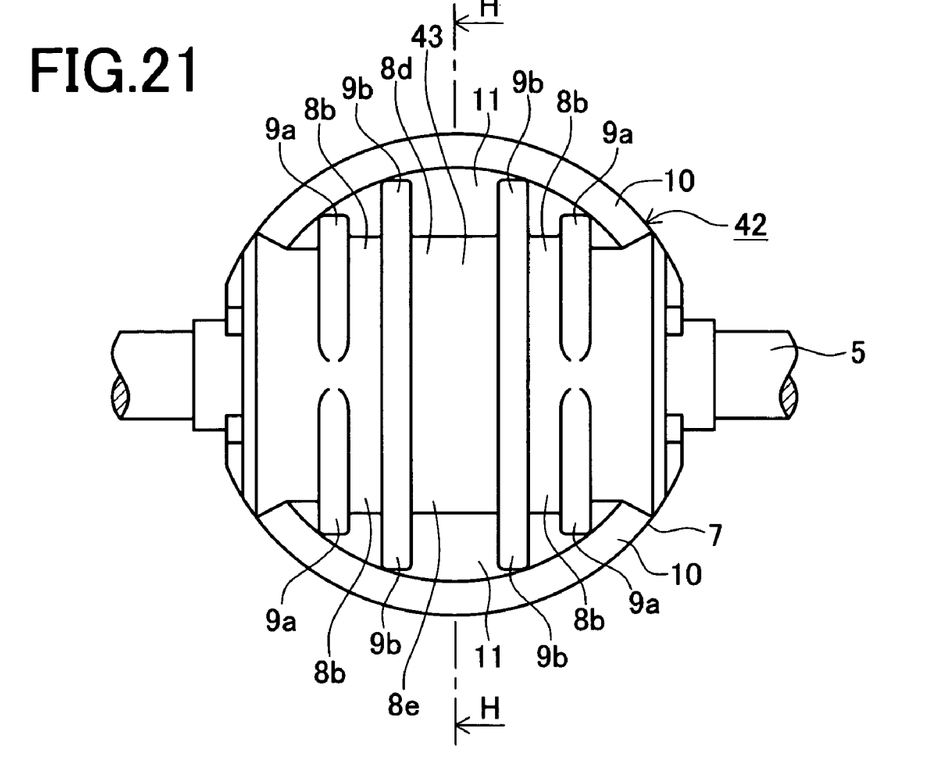
FIG. 21 is a partially-sectional plan view of a butterfly valve in a fourth embodiment.
Figure 22:
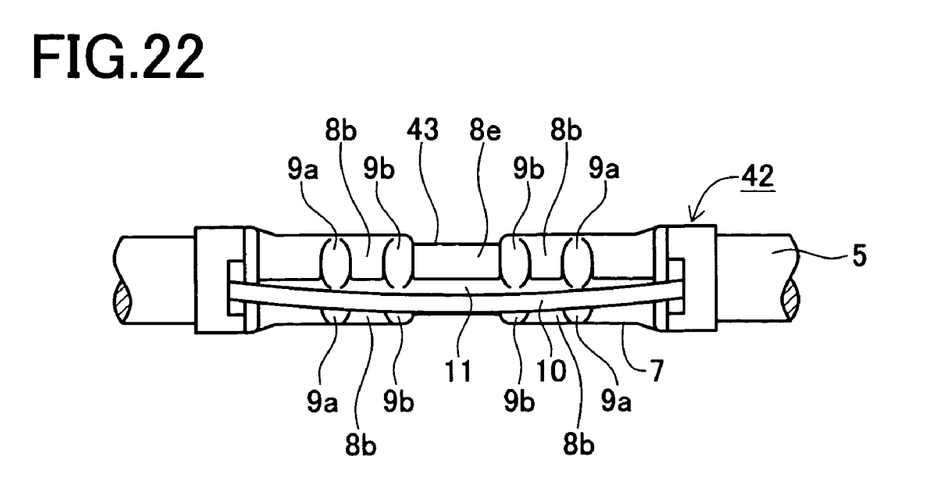
FIG. 22 is a front view of the butterfly valve of FIG. 21.
Figure 23:
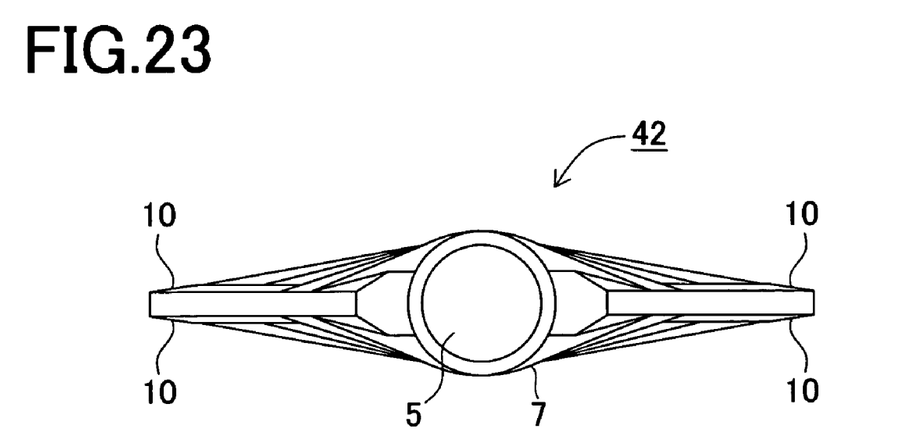
FIG. 23 is a right side view of the butterfly valve of FIG. 21.
Figure 24:
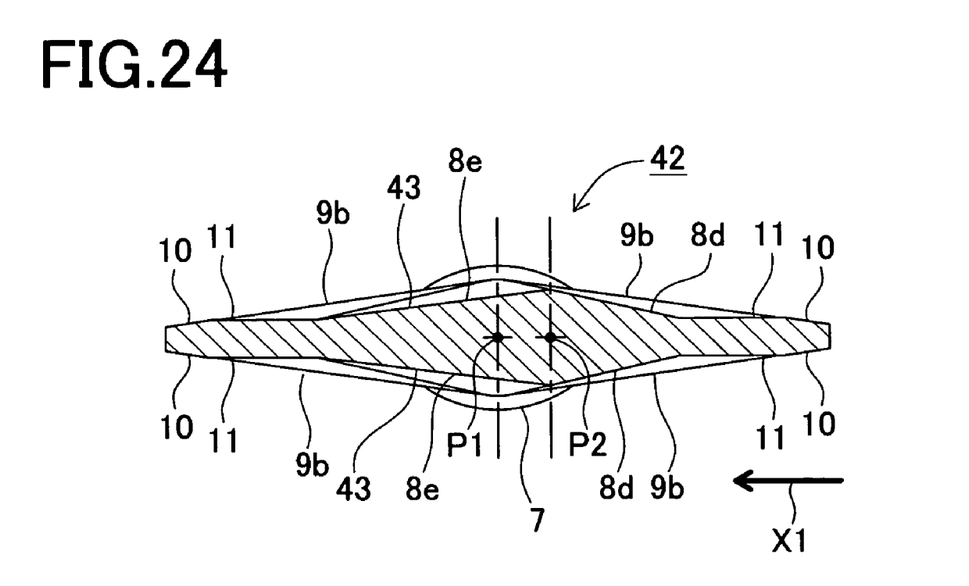
FIG. 24 is a sectional view taken along a line H-H of FIG. 21.

FIG. 21 is a partially-sectional plan view of a butterfly valve 42 in the present embodiment. FIG. 22 is a front view of the butterfly valve of FIG. 21. FIG. 23 is a right side view of same. FIG. 24 is a sectional view taken along a line H-H of FIG. 21.

The butterfly valve 42 in the present embodiment differs in the following respects from the butterfly valve 21 in the second embodiment. Specifically, this butterfly valve 42 includes a valve shaft 5 and a valve element 7 which are integrally molded from resin. The butterfly valve 42 is further provided with a groove 43 on each side of the valve element 7 so that the groove 43 traverses the center of each side in a direction perpendicular to the valve shaft 5. As shown in FIG. 21, the groove 43 is formed between two second flow straightening ribs 9b. As shown in FIG. 24, the valve element 7 is designed such that the thickness of a portion corresponding to this groove 43 is largest at a point P2, which is slightly upstream of the center axis P1 of the valve shaft 5 in the intake flow direction X1. Accordingly, an inclined surface 8d on the upstream side of the point P2 and an inclined surface 8e on the downstream side of the point P2 are formed with different length and different inclination angle. The section of the groove 43 (i.e. the inclined surface 8e) is therefore similar in shape to a wing of an airplane with respect to the intake flow. The butterfly valve 42 in the present embodiment is otherwise identical to the butterfly valve 21 in the second embodiment.

As above, the butterfly valve 42 in the present embodiment is structured such that the section of the groove 43 is similar in shape to the airplane wing with respect to the intake flow, thus allowing a smoother intake flow in the groove 43. The butterfly valve 42 in the present embodiment is otherwise basically identical to the butterfly valve 21 in the second embodiment and therefore can provide workings and effects as well as the butterfly valve 21 in the second embodiment.

Fifth Embodiment

A fifth embodiment of the butterfly valve of the present invention will be explained below referring to the accompanied drawings.

Figure 25:
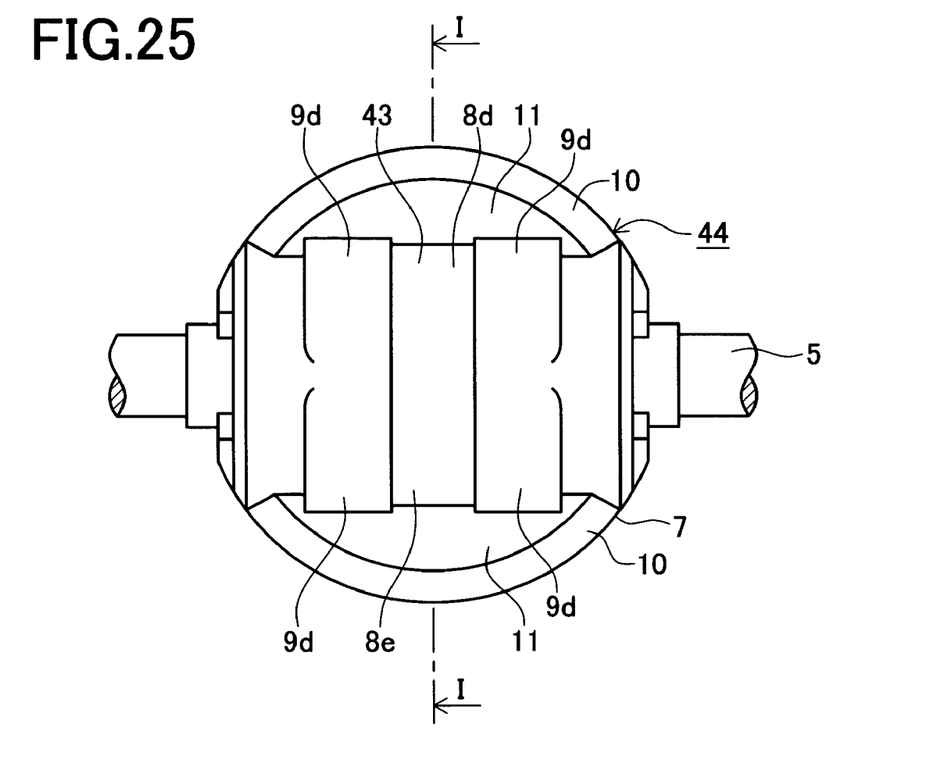
FIG. 25 is a partially-sectional plan view of a butterfly valve in a fifth embodiment.
Figure 26:
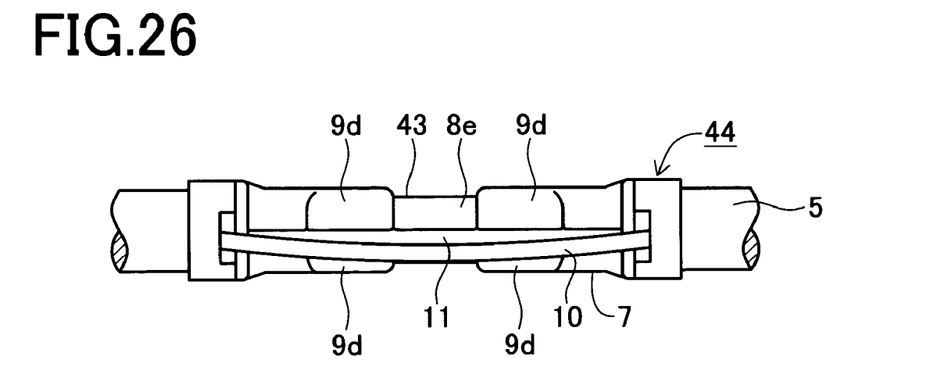
FIG. 26 is a front view of the butterfly valve of FIG. 25.
Figure 27:
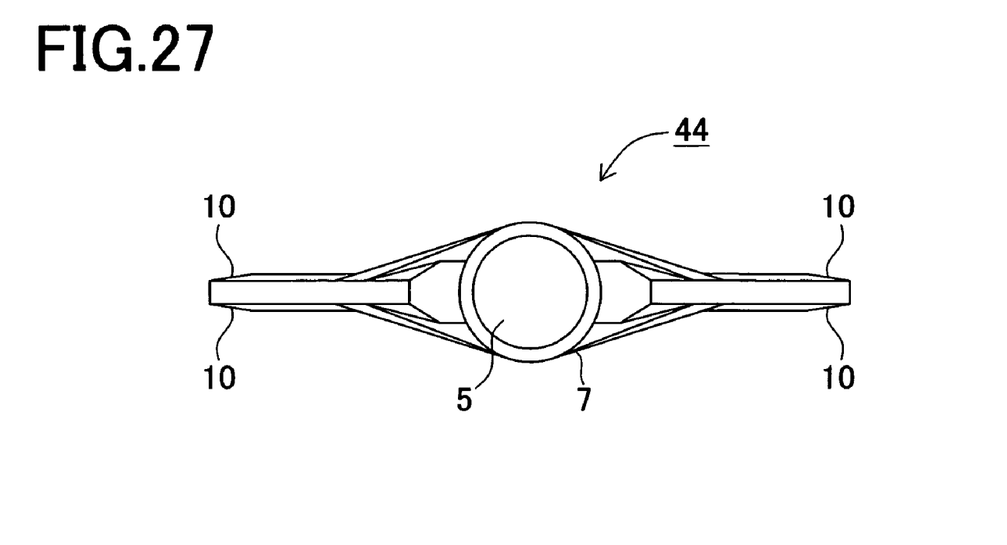
FIG. 27 is a right side view of the butterfly valve of FIG. 25.
Figure 28:
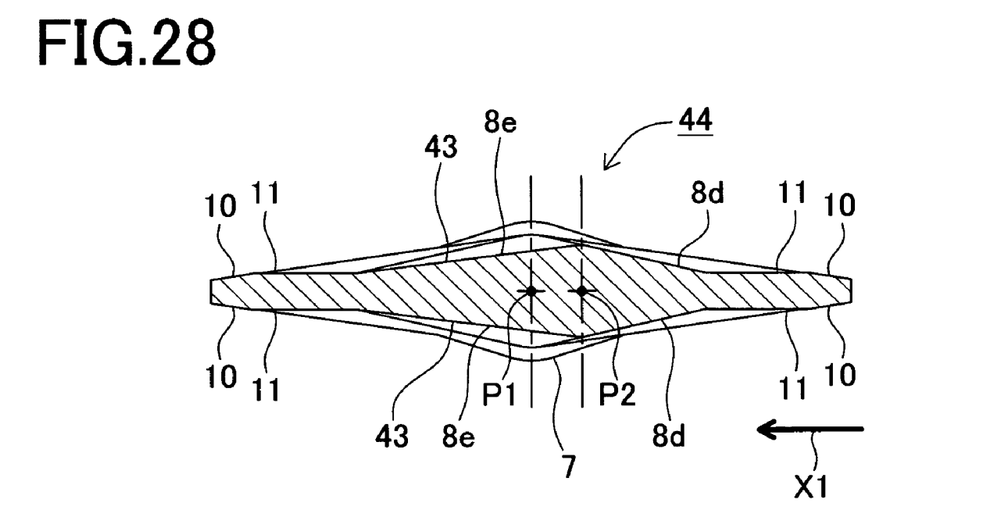
FIG. 28 is a sectional view taken along a line I-I of FIG. 25.

FIG. 25 is a partially-sectional plan view of a butterfly valve 44 in the present embodiment. FIG. 26 is a front view of the butterfly valve of FIG. 25. FIG. 27 is a right side view of same. FIG. 28 is a sectional view taken along a line I-I of FIG. 25.

The butterfly valve 44 in the present embodiment differs in the following respects from the butterfly valve 42 in the fourth embodiment. Specifically, the butterfly valve 44 is provided on each side of the valve element 7 with a pair of rather thick flow straightening ribs 9d extending in a direction perpendicular to the valve shaft 5. Further, the butterfly valve 44 is provided on each side of the valve element 7 with a groove 43 extending in the direction perpendicular to the valve shaft 5 while traversing the center of each side. As shown in FIGS. 25 and 26, the groove 43 is formed between the two flow straightening ribs 9d. As shown in FIG. 28, the section of the groove 43 is similar in shape to a wing of an airplane with respect to the intake flow, as well as the butterfly valve 42 in the fourth embodiment. The butterfly valve 42 in the present embodiment is otherwise identical to the butterfly valve 42 in the fourth embodiment.

As above, the butterfly valve 44 in the present embodiment is structured such that the section of the groove 43 is similar in shape to the airplane wing with respect to the intake flow, thus allowing a smoother intake flow in the groove 43. The butterfly valve 44 in the present embodiment is otherwise basically identical to the butterfly vale 42 in the fourth embodiment and thus can provide workings and effects as well as the butterfly valve 42 in the fourth embodiment.

The present invention may be embodied in other specific forms without departing from the spirit or essential characteristics thereof.

Figure 29:
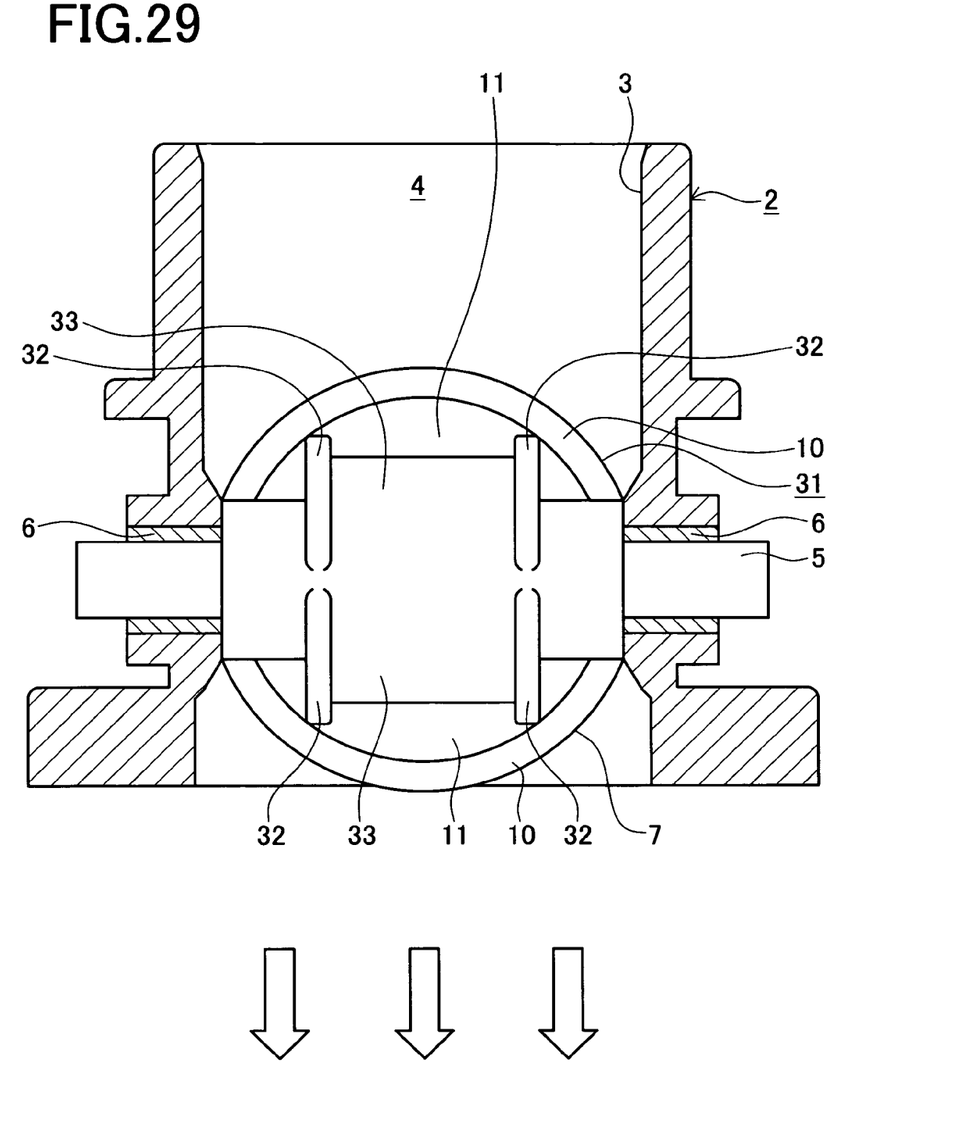
FIG. 29 is a partially-sectional plan view of a throttle body including a butterfly valve in a modified example.

For instance, in each of the above embodiments, four or five flow straightening ribs 9a to 9c each extending in the direction perpendicular to the valve shaft 5 on each side of the valve element 7. Alternatively, as a butterfly valve 31 shown in FIG. 29, it may be provided with flow straightening ribs 32 extending in a direction perpendicular to the valve shaft 5 only at positions near both ends of the valve shaft 5 on each side of the valve element 7. In this valve element 7, an inclined surface 33 is formed between each pair of the flow straightening ribs 32 so that the inclined surfaces 33 have the same section. With this structure, the butterfly valve 31 can also provide workings and effects as well as in the first embodiment.

In the first embodiment, the valve element 7 is of a tapered section gradually decreasing in thickness from the valve shaft 5 toward the outer edge in the direction "perpendicular" to the valve shaft 5. Further, on each side of the valve element 7, the plurality of flow straightening ribs 9a to 9c is provided extending in the direction "perpendicular" to the valve shaft 5. In the second embodiment, additionally, on each side of the valve element 7, the groove 22 is provided extending in the direction "perpendicular" to the valve shaft 5 while traversing the center of each side. Here, "perpendicular" normally represents "intersecting at right angle" but also includes angles slightly larger or smaller than the right angle in addition to the exact right angle. Specifically, the present invention permits that the above mentioned angle is a nearly right angle, which will cause no difference in workings and effects from the case of an exact right angle.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A butterfly valve mountable in a valve body formed with a flow passage, the butterfly valve comprising:
    a valve shaft placed across the flow passage; and
    a plate-like valve element provided on the valve shaft so as to be rotatable about the valve shaft to regulate a flow rate of fluid in the flow passage;
    wherein the valve element includes a front side and a back side each including at least a flow straightening surface so that a portion of the valve element including the flow straightening surface has a cross section having a thickness gradually decreasing from the valve shaft toward an outer edge in a direction nearly perpendicular to the valve shaft and being uniform in a direction parallel to the valve shaft,
    wherein the valve element includes a flow straightening rib on each of the front side and the back side and the flow straightening ribs thus provided are symmetric between the front side and the back side.

2. The butterfly valve according to claim 1, wherein
the flow straightening surface is an inclined surface, and
the valve element includes identical inclined surfaces on an upstream side and a downstream side of the valve shaft.

3. The butterfly valve according to claim 2,
the flow straightening rib extending in the direction nearly perpendicular to the valve shaft and inclining downward from the valve shaft toward the outer edge as with the inclined surface.

4. The butterfly valve according to claim 2, wherein
the valve element is provided, on each side thereof, with a groove extending in the direction nearly perpendicular to the valve shaft while traversing the center of each side.

5. The butterfly valve according to claim 3, wherein
the valve element is provided, on each side thereof, with a groove extending in the direction nearly perpendicular to the valve shaft while traversing the center of each side.

6. The butterfly valve according to claim 1, wherein
the flow straightening surface is a curved surface, and
the valve element includes identical curved surfaces on an upstream side and a downstream side of the valve shaft.

7. The butterfly valve according to claim 6,
the flow straightening rib extending in the direction nearly perpendicular to the valve shaft and inclining downward from the valve shaft toward the outer edge as with the curved surface.

8. The butterfly valve according to claim 6, wherein
the valve element is provided, on each side thereof, with a groove extending in the direction nearly perpendicular to the valve shaft while traversing the center of each side.

9. The butterfly valve according to claim 7, wherein
the valve element is provided, on each side thereof, with a groove extending in the direction nearly perpendicular to the valve shaft while traversing the center of each side.

10. The butterfly valve according to claim 1, wherein
the flow straightening surface is an inclined surface and a curved surface, and
the valve element includes the inclined surface on an upstream side of the valve shaft and the curved surface on a downstream side of the valve shaft.

11. The butterfly valve according to claim 10,
the flow straightening rib extending in the direction nearly perpendicular to the valve shaft and inclining downward from the valve shaft toward the outer edge as with the inclined surface and the curved surface.

12. The butterfly valve according to claim 10, wherein
the valve element is provided, on each side thereof, with a groove extending in the direction nearly perpendicular to the valve shaft while traversing the center of each side.

13. The butterfly valve according to claim 11, wherein
the valve element is provided, on each side thereof, with a groove extending in the direction nearly perpendicular to the valve shaft while traversing the center of each side.

14. The butterfly valve according to claim 1, wherein
the flow straightening surface is an inclined surface and a curved surface, and
the valve element includes the curved surface on an upstream side of the valve shaft and the inclined surface on a downstream side of the valve shaft.

15. The butterfly valve according to claim 14,
the flow straightening rib extending in the direction nearly perpendicular to the valve shaft and inclining downward from the valve shaft toward the outer edge as with the inclined surface and the curved surface.

16. The butterfly valve according to claim 14, wherein
the valve element is provided, on each side thereof, with a groove extending in the direction nearly perpendicular to the valve shaft while traversing the center of each side.

17. The butterfly valve according to claim 15, wherein
the valve element is provided, on each side thereof, with a groove extending in the direction nearly perpendicular to the valve shaft while traversing the center of each side.

18. The butterfly valve according to claim 1,
the flow straightening rib extending in the direction nearly perpendicular to the valve shaft and inclining downward from the valve shaft toward the outer edge as with the flow straightening surface.

19. The butterfly valve according to claim 1, wherein
the valve element is provided, on each side thereof, with a groove extending in the direction nearly perpendicular to the valve shaft while traversing the center of each side.

20. The butterfly valve according to claim 18, wherein
the valve element is provided, on each side thereof, with a groove extending in the direction nearly perpendicular to the valve shaft while traversing the center of each side.

* * * * *